United States Patent Office 2,787,335
Patented Apr. 2, 1957

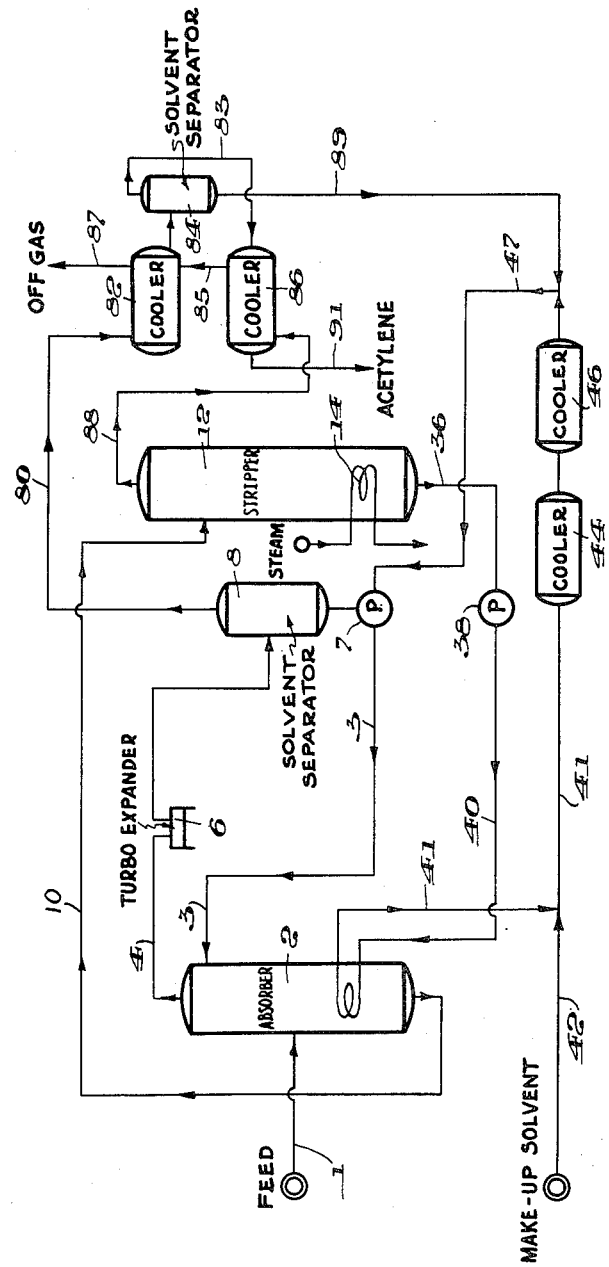

2,787,335

REMOVAL OF ACETYLENE COMPONENTS FROM GAS

Robert L. Irvine, Pittsburgh, Pa., assignor to Koppers Company, Inc., a corporation of Delaware Original application April 20, 1953, Serial No. 349,676. Divided and this application September 13, 1955, Serial No. 537,388

2 Claims. (Cl. 183—120)

This invention relates to the removal of an acetylene component, e. g., acetylene, acetylene and minor amounts of ethylene, and the like, from a gaseous stream containing the acetylene component, and is a division of the invention of my application Serial No. 349,676, filed April 20, 1953.

The separation of acetylene components from gaseous streams is of particular interest because of the importance of acetylene manufacture and because of the presence of acetylene in industrial gases, particularly in pyrolysis and refinery gases. The removal of acetylene components from these gases is a matter of vital concern. In the case of regenerative furnace gas, rich in acetylene, produced by high temperature pyrolysis of hydrocarbon materials the invention has significant application. In addition acetylene must be recovered from gaseous products obtained by cracking hydrocarbon oils at elevated temperatures, such as are obtainable in the electric arc. Further in the manufacture of butadiene, for example, for use in synthetic rubber production, the crude butadiene is generally associated with acetylene.

It is known that by distillation means acetylenes are difficult to separate from gases in admixture therewith, i. e. their gaseous component, such as ethylene, because of small differences in boiling points involved, or because the mixture exists as a constant boiling point mixture. Furthermore, acetylene is explosive in nature and normally safety measures must prevent the partial pressure of acetylene from exceeding twenty-five pounds per square inch absolute. As a result numerous methods other than distillation have been suggested for the separation of acetylene from its gaseous component. One such method is solvent extraction. By this method, for economic reasons, a volatile solvent is normally employed, for example acetaldehyde, ethyl alcohol, cyclohexanone, diethyl carbonate, methyl ethyl ketone, diethylene glycol, and dimethyl formamide. Other volatile solvents having a high degree of selectivity for acetylene are, of course, known to those skilled in the art, a volatile solvent being defined as a solvent having a boiling point at atmospheric pressure of less than 300° F. Volatile solvents for acetylene, e. g. acetone, have been found to be selective in absorbing many times their volume in acetylene. In addition volatile solvents are especially preferred from the point of heat economy because of ease in reboiling, i. e. to separate solvent from absorbed acetylene. However although these solvents are more suitable for absorption than the usual solvents which dissolve gases only in accordance with Raoult's law, there are certain attendant difficulties. Because of their volatility considerable quantities are carried off in liberated gaseous streams. The purifications, using a volatile solvent, of gas streams having significant quantities of acetylene therefore entails considerable loss of solvent or the use of additional chemicals or other means for its removal.

By the practice of this invention a process is provided for separating acetylene from admixture with a gaseous component by the use of a volatile solvent, yet with very low solvent loss. By the practice of this invention a very efficient and economical means for removing acetylene is provided with excellent solvent recovery. In accordance with this invention an acetylene component is absorbed by a solvent in an absorber. The absorber off-gas exiting at the top of the absorber is expanded to achieve liquefaction of solvent and the expanded off-gas goes to a solvent separator from which recovered solvent is returned to the absorber. The solvent containing the acetylene component, leaving the bottom of the absorber is introduced to the top of a stripper. The stripped vapor, the acetylene component saturated with solvent, is then treated to remove solvent therefrom. It is either cooled by the cold off-gas stream as described hereinafter or it is passed to one of two solid adsorbent cases alternating on stream as described in my copending application Ser. No. 349,676. Acetylene-free solvent from the bottom of the stripper is circulated back to the absorber.

The solvent employed in the absorber, i. e. in the acetylene extraction, should, of course, have a greater affinity for the acetylene component than for the remaining component. Thus according to an embodiment of this invention an acetylene component is removed from a gaseous stream with a volatile solvent by: contacting said gaseous feed stream under pressure with said volatile solvent to form a solvent phase containing an extract richer in acetylene than the gaseous feed stream and an off-gas stream richer in remaining gases than the gaseous feed stream; reducing the pressure on the off-gas stream to cool said stream by expansion thereby liquefying volatile solvent therein; heating the solvent phase from the acetylene extraction to strip the acetylene-rich gas therefrom as a solvent-saturated acetylene-rich stream; passing the solvent-saturated acetylene-rich gas stream from the stripper into indirect heat exchange contact with expanded off-gas from which the said liquefied volatile solvent has been removed; separating solvent and acetylene as separate components from the said acetylene-rich gas stream by such heat exchange; and conducting acetylene-free solvent from the acetylene stripping step and the liquefied solvent from the expansion step back to the acetylene extraction for further use in acetylene removal.

For the purpose only of illustrating the invention, the single figure shows, as an embodiment of the invention, a schematic flow diagram of an acetylene separation process in which acetylene is absorbed in a volatile solvent, is stripped therefrom, and in which solvent is recovered from the gas from which the acetylene has been removed.

Referring to the said single figure, feed gas containing acetylene is flowed through a line 1 into an absorber 2, a volatile solvent is introduced into the said absorber 2 through a line 3. The solvent is introduced at a point near the top of the absorber, and the feed gas at a midpoint or below, so that the feed gas and solvent flow in countercurrent contact therebetween. The absorption column 2 is provided with a reboiling section whereby the less soluble constitutents are stripped out. The absorber off-gas exiting at 4 is expanded by means of a turbine or similar expander 6 to achieve liquefaction of the solvent. The expanded off-gas goes to solvent separator 8 from where recovered solvent is returned to absorber 2 by pump 7 through line 3. The cooled off-gas stream free of solvent can then be employed as described hereinafter. The solvent phase containing an extract richer in acetylene than the feed stream, on a solvent-free basis, is conducted from the bottom of absorber 2 through line 10 to stripper 12, provided with a steam reboiler 14. In stripper 12 a separation is made between the acetylene component and the solvent. The solvent is withdrawn from the bottom of the stripper through line 36 and by means of pump 38 conducted through line 40 indirectly to supply reboiling heat to absorber 2 in its reboiling section, the solvent being partially cooled thereby. Cooled solvent flows from the reboiling section of absorber 2 through a line 41 into coolers 44 and 46 in which the solvent is cooled indirectly by water and brine respectively. Make-up solvent is flowed through line 42 to juncture with line 41 and into admixture therein with the cooled recycled solvent. The cooled solvent mixture flows through line 47 to pump 7 and is pumped thereby through line 3 into the absorber 2.

Overhead vapors from the stripper 12 are flowed through line 88 into a cooler 86 and thence through line 85 to a second cooler 82. Cooled expanded off-gas from which solvent has been separated in solvent separator 8 flows therefrom through line 80 into the cooler 82 and into indirect contact therein with vapors flowing from the said stripper 12 and cooler 86. Off-gas flows from the cooler 82 through line 87 and can be brought into indirect contact by means, not shown, with fresh feed gas to cool feed gas prior to its introduction into absorber 2.

The said overhead vapors, comprising acetylene-rich gas saturated with volatile solvent is cooled in the cooler 82 to a temperature at which solvent condenses therefrom. The resulting mixture of gas and condensed solvent flows from cooler 82 into a solvent separator 84. Acetylene separated therein flows through line 83 into the said cooler 86. Condensed volatile solvent from the solvent separator 84 flows through line 89 and mixes with cooled stripped solvent and make-up solvent flowing from cooler 46 in line 47, from which the solvent is then pumped by pump 7 through line 3 to the absorber 2.

The indirect heat exchange contact of cooled acetylene in the cooler 86 with overhead stripper vapors flowing into the cooler through line 80 precools the said vapors prior to their admission to cooler 82. Acetylene flows from the cooler 86 through product line 91.

By way of example, acetone is flowed into the upper part of an absorber and brought into countercurrent absorbing contact with acetylene in a feed gas stream. The overhead absorber off-gas which is saturated with solvent and from which acetylene is substantially entirely removed exits at approximately 115 p. s. i. a. and 20° F. This overhead off-gas passes through an entrainment remover and is expanded adiabatically to 20 p. s. i. a. to achieve a temperature of −100° F., thereby bringing about liquefaction of the acetone solvent by internal refrigeration. The expanded off-gas is then passed to a solvent separator and the recovered acetone is returned to the top of the absorber. The acetone containing the acetylene product, leaving the bottom of the absorber at 50° F., is introduced to the top of a stripper operating at 20 p. s. i. a. and provided with a steam reboiler. Stripper vapor, comprising acetylene and acetone, flows into indirect heat exchange with cooled acetylene, and, thus precooled, flows into indirect heat exchange with off-gas at a temperature of about −100° F. Acetone is condensed from the stripper vapors by the cooling effect of the expanded off-gas at −100° F. Acetylene is separated from the condensed acetone in the solvent separator and is then used to precool stripper vapors before being recovered as product. Acetylene-free acetone from the solvent separator is recycled to the absorber in admixture with acetylene-free acetone from the bottom of the stripper, this latter acetone having been cooled by heat exchange in the absorber reboiler, by indirect contact with cooling water to a temperature of 90° F., and by refrigerated brine to a temperature of 15° F.

It will be understood that the absorbing column is operated under pressure so that the off-gas stream from the top of the absorber can be expanded to achieve liquefaction of the solvent. In general the absorber pressure and the expanded off-gas pressure will be controlled so that the expansion ratio is such that a temperature is produced which is sufficiently low to result in liquefaction of the volatile solvent. Normally the acetylene extraction pressure, and the expanded off-gas stream pressure will be such that the expansion ratio is in the range of 8:1 to 4:1, preferably 6:1. The turboexpander employed will be able to accommodate from three percent to five percent liquid. It is understood, of course, that the expansion can be brought about by means other than turboexpanders, e. g. reciprocating machines. The liquefied solvent is therefore thrown out and can be recovered in the solvent separator. The cold expanded off-gas stream can then be utilized in the refrigeration of (1) the circulating solvent stream, (2) the absorber charge after regenerating the solvent recovery cases, or (3) the stripper overhead vapors.

The absorber can be operated at a temperature in the range from below the boiling point of the solvent at operating pressure, normally at a temperature obtainable by indirect heat exchange with cooling water, to temperatures achieved by refrigeration, say −20° F. The absorber column pressure is generally an economical compromise. It must be low enough for good selectivity but high enough for solvent recovery by expansion of the off-gas, for example, from 60 to 200 pounds per square inch absolute. The stripper, on the other hand, is usually operated at the boiling point of the solvent at the reboiler. Since the operation of the stripper is determined by the explosive limit for acetylene, the pressure should be less than 30 pounds per square inch absolute.

It is understood that in addition to acetylene other gases which may be present in the acetylene component can also be recovered, that is, gases which are dissolved to any extent by the acetone along with acetylene. In these instances only additional towers are necessary for making further separation. Thus if the feed gas contains acetylene derivatives of higher molecular weight an additional tower can be inserted after the acetylene stripper. The solvent from the absorber, containing acetylenic components is conducted to a first stripper wherein the acetylene product is removed. But the solvent phase from the bottom of the stripper instead of being cooled and returned to the absorber is sent to a second stripper wherein the acetylenic derivatives are removed as overhead products. The acetylene derivatives can be also passed over a solid adsorbent while solvent from the bototm of the second stripper is cooled and recirculated back to the absorber.

Solid adsorbents are, of course, well known in the art, a desirable one being activated carbon. Examples of other suitable solid adsorbents are silica gel, charcoal, alumina gel, and diatomaceous earth.

The instant invention is also applicable to solvent recovery processes wherein sufficient ethylene is absorbed by the selective solvent for acetylene to warrant recovery. In this case an additional tower is also used. The selective absorbent absorbs the acetylene with a minor amount of ethylene, most of the ethylene content of the feed gas passing through the absorbent. In the first tower, to which the solvent phase from the absorber is conducted, ethylene is removed as the overhead product. The solvent phase is then passed to a second tower where acetylene is removed as the overhead product. The solvent is then cooled and recycled to the absorber, and the ethylene product and acetylene product separately recovered. Obviously if the feed stream also contains higher molecular weight acetylenic compounds a third column can be employed for their removal as described hereinbefore. If carbon dioxide is present in the acetylene component it can be removed along with the ethylene product from the first tower. The ethylene product containing carbon dioxide can then be passed through a selective solvent for carbon dioxide in order to obtain a purified ethylene stream.

The above description and disclosure of specific embodiments are intended to be illustrative only and other embodiments may be made without departing from the spirit and the scope of this invention. Thus as disclosed hereinbefore the present invention is applicable not only to high temperature pyrolysis gases but to other industrial gases. Obviously the invention is equally applicable to acetylene charges produced by such means as distillation, absorption, or hypersorption.

I claim:

1. A process for removing an acetylene component from a gaseous stream with a volatile solvent, said solvent having a greater affinity for acetylene, which comprises contacting said gaseous feed stream under pressure with said volatile solvent to form a solvent phase containing an extract richer in acetylene than the gaseous feed stream and an off-gas stream richer in remaining gases than the gaseous feed stream; reducing the pressure on the off-gas stream to cool said stream by expansion thereby liquefying volatile solvent therein, the acetylene extraction pressure and the expanded off-gas pressure being controlled so that the expansion ratio is such that a temperature is produced sufficiently low to result in liquefaction of the volatile solvent; heating the solvent phase from the acetylene extraction to the boiling temperature of acetylene to strip the acetylene-rich gas therefrom as a solvent-saturated acetylene-rich stream; cooling said stream by indirect heat exchange with the expansion-cooled off-gas stream; and employing the acetylene-rich gas thus cooled in precooling hot acetylene-rich gases prior to their indirect heat exchange with the expansion-cooled off-gas stream thereby achieving liquefaction of solvent in the solvent-saturated acetylene-rich stream.

2. A process for removing acetylene from a gaseous stream with acetone, which comprises contacting said gaseous feed stream under pressure with said acetone to form a solvent phase containing an extract richer in acetylene than the gaseous feed stream and an off-gas stream richer in remaining gases than the gaseous feed stream but saturated with acetone; reducing the pressure on the off-gas stream to cool said stream by an expansion thereby liquefying the acetone, the acetylene extraction pressure and the expanded off-gas stream pressure being such that the expansion ratio is in the range of 8:1 to 4:1; heating the solvent phase from the acetylene extraction to the boiling temperature of acetylene to strip the acetylene-rich gas therefrom as a solvent-saturated acetylene-rich stream; cooling said stream by indirect heat exchange with the expansion-cooled off-gas stream; employing the acetylene-rich gas thus cooled in precooling hot acetylene-rich gases prior to their indirect heat exchange with the expansion-cooled off-gas stream thereby achieving liquefaction of solvent in the solvent-saturated acetylene-rich stream; and separately recovering the solvent-free acetylene-rich stream and the liquefied solvent.

References Cited in the file of this patent

UNITED STATES PATENTS

| | | |
|---|---|---|
| 1,900,655 | Metzger | Mar. 7, 1933 |
| 2,241,717 | Robinson et al. | May 13, 1941 |